Patented Jan. 1, 1946

2,392,294

UNITED STATES PATENT OFFICE 2,392,294

PHOTOCHEMICAL PREPARATION OF THIO-ETHERS

Frederick F. Rust and William E. Vaughan, Berkeley, Calif., assignors to Shell Development Company, San Francisco, Calif., a corporation of Delaware No Drawing. Application May 29, 1941, Serial No. 395,762

8 Claims. (Cl. 204—158)

The present invention relates to a process for the preparation of thio-ethers by reacting aliphatic mercaptans with symmetrical or unsymmetrical organic compounds containing unsaturated linkages of aliphatic character. In one of its more specific embodiments, the invention pertains to a novel method of effecting a controlled reaction between aliphatic mercaptans and unsymmetrical organic compounds containing at least one unsaturated linkage of aliphatic character, i. e. an olefinic or acetylenic bond, to produce addition products of predetermined character.

The invention provides a practical and economical method for the utilization of aliphatic mercaptans to effect the conversion of unsaturated organic compounds, particularly those contained in or derived from petroleum and/or petroleum products, such as olefins, poly-olefins and olefin polymers, as well as of substituted derivatives thereof, such as unsaturated organic alcohols, ethers, esters, and the like, having at least one unsaturated linkage of aliphatic character, to valuable addition products thereof.

It is known that thio-ethers may be produced by subjecting mixtures of suitable mercaptans and unsaturated organic compounds, e. g. unsaturated hydrocarbons, to elevated temperatures in the neighborhood of from 200° C. to 700° C. In some cases, such reactions were effected at superatmospheric pressures. When such reactions are effected under the outlined conditions of operation, the sulfur or the mercapto group of radical attaches predominantly to the unsaturated carbon atom holding the most hydrogen atoms. In other words, this addition takes place contrary to the course suggested by the Markownikoff rule, and is therefore designated as "abnormal" addition on the assumption that mercaptans should add like halogen acids. It is also known that the abnormal addition of mercaptans to unsaturated organic compounds is catalyzed by free oxygen, air, ozone, peroxides, ascaridole, and the like, and that compounds of the type of hydroquinone and piperidine act as reaction inhibitors.

It has now been discovered that unsaturated organic compounds of the class more fully described hereinbelow may be reacted with an aliphatic mercaptan or mercaptans to effect a rapid and efficient conversion of the unsaturates to thio-ethers, this reaction being substantially solely via abnormal addition and being effected in the absence of any compound or substance the presence of which was heretofore considered or deemed necessary for promoting or catalyzing the aforementioned abnormal addition reaction. Also, this conversion of the unsaturated organic compounds, via abnormal addition, to the corresponding thio-ethers is effected, according to the present process, without the necessity of resorting to high temperatures and/or elevated pressures.

Broadly stated, the present invention resides in a photo-chemical process of effecting the addition of aliphatic mercaptans under the deliberate influence of ultra-violet radiation, this reaction being effected at normal temperatures, i. e. in the range of from about 25° C. to about 15° C., or even at considerably lower temperatures. More particularly stated, the reaction is effected under the influence of light rays having a wave length of below about 2900 to 3000 A. U. (Angstrom units). It has been still further discovered that these light rays strongly catalyze the photochemical addition of the mercaptans, this addition, in the absence of any compound or substance heretofore considered necessary for promoting or catalyzing such reaction, being preponderantly, if not wholly, via the above-defined "abnormal" addition, and therefore in accordance with the rule proposed by Posner [Berichte, 38, 646 (1904)]. Therefore, the photo-chemical reaction taking place under the deliberate influence of ultra-violet radiations offers a direct, efficient, and very rapid method for obtaining primary thio-ethers from hydrocarbons containing a terminally unsaturated carbon atom.

The unsaturated organic compounds to which the invention is particularly applicable possess at least one unsaturated linkage between two aliphatic carbon atoms regardless of the character of the compound embracing such a linkage. The unsaturated hydrocarbons such as the olefins, which term is intended to include also poly-olefins and olefin polymers, are particularly contemplated. Examples of unsaturated hydrocarbons are: ethylene, propylene, butene-1, butene-2, isobutylene, the amylenes, hexene-1, hexene-2, 4-methyl-pentene-1, 4-methyl-pentene-2, 4,4-dimethyl-pentene-1, octene-1, decene-1, cetene-1, styrene, cyclohexene, 3-methyl-cyclohexene, 1,4-diphenyl-butene-2, butadiene-1,3, pentadiene-1,3, pentadiene-1,4, hexadiene-1,4, hexadiene-1,5, acetylene, propyne, butyne-1, pentyne-2, hexyne-1, cetyne-1, methyl vinyl acetylene, octyl-acetylene, phenyl acetylene, etc., and their homologues and analogues. The unsaturated hydrocarbons of the above-defined class may also have one or more of their hydrogen atoms substituted by suitable organic and/or inorganic substituents, which may include such substituents as alkoxy, alkenoxy, alkyloxy, araloxy, alkylimido, etc. As examples, reference may be made to methyl acrylate, methyl methacrylate, divinyl ether, diallyl ether, dimethallyl ether, allyl alcohol, and the like.

The invention is particularly applicable to the reaction of suitable mercaptans with unsaturated organic compounds, e. g. unsaturated hydrocarbons, having a terminal aliphatic unsaturated linkage, the reaction products predominating in or consisting substantially solely of primary thio-ethers.

Any sufficiently stable aliphatic mercaptan is suitable as a reactant to be employed in the photochemical addition thereof to the defined class of unsaturated organic compounds. A suitable aliphatic mercaptan may contain one or more sulfhydryl groups or radicals. In the majority of cases it is preferable to employ the normal or iso alkyl chain mercaptans of primary, secondary or tertiary character, particularly those contained or derived from petroleum and petroleum products. The methyl, ethyl, butyl, amyl, hexyl, heptyl, octyl and the like mercaptans, as well as their homologues, analogues and substitution products, may be employed with excellent results.

Another group of mercaptans which may be employed as one of the two reactants comprises or includes the dimercaptans, and particularly the polymethylene dimercaptans of the general formulas $HS(CH_2)_nSH$. This group of mercaptan may be reacted with, for example, aliphatic hydrocarbons containing a plurality of unsaturated linkages to produce thio-ethers having a high molecular weight. A particularly suitable group of unsaturated organic compounds which may be employed with these dimercaptans includes the unsaturated compounds containing unsaturated linkages of aliphatic character in alpha and omega positions (i. e. in terminal positions). Due to the "abnormal" addition reaction, the resulting products predominate in or consist of mercapto thio-ethers and polythio-ethers. For example, pentadiene-1,4 may be thus reacted with n-pentamethylene dimercaptan to produce normal polyalkylene thiols having the general formulas R—S—R'—S—R, wherein R' is a n-pentamethylene radical, and R represents a mercapto and/or thio-ether derivative of the reactants. Similarly, diallyl ether may be reacted with a dimercaptan to produce high molecular weight compounds which contain both ether oxygen atoms and thio-ether sulfur atoms in the chain. Instead of employing aliphatic straight chain poly-unsaturated hydrocarbons, it is also possible to use branched chain hydrocarbons or substituted derivatives thereof, provided such compounds contain at least one, and preferably two or more unsaturated linkages of aliphatic character. These poly-unsaturated organic compounds may or may not have unsaturated linkages in alpha-omega positions.

The reaction of the mercaptans (which term also includes the poly-mercaptans, such as the mentioned polymethylene dimercaptans) with the above-defined class of unsaturated organic compounds under the influence of ultra-violet radiations may be effected in the vapor or liquid phase, or in a two-phase liquid-vapor system. Since the abnormal addition of the mercaptan according to the present process occurs photochemically, no heating is necessary. In fact, although the reaction may be realized at atmospheric temperatures, i. e. between about 15° C. and about 25° C., it may frequently be effected at temperatures as low as 0° C., and even considerably below this temperature. For example, good results may be attained by employing temperatures of —75° C. and even lower. Obviously, the reaction temperature must be above that at which the reactants solidify. Although the photochemical reaction may be effected at any pressure, it is preferred to employ superatmospheric pressures which are at least sufficient to maintain the reactants in a liquid phase. This is because the conversion rate appears to be accelerated when the reaction is effected in the liquid phase.

Although the reaction described herein may be promoted by using the whole range of ultra-violet rays, the most effective wave-lengths of light which catalyze the desired addition of mercaptans appear to lie in that portion of the spectrum which is below about 3200 A. U., and more particularly in the region of about 2900 A. U. and below. In fact, the interposing of an ordinary window glass filter (which has a lower limit of transmission of about 3300 A. U.) or of a Pyrex glass filter having a low transmission limit of about 2900 A. U. to 3000 A. U., in the path of light coming from a source emitting ultra-violet radiations, will cause a substantial if not complete inhibition of the reaction unless some sensitizing material, such as an organic peroxide, is added. On the other hand, the use of quartz vessels for the reaction allows efficient addition of the mercaptans due to the fact that quartz transmits ultra-violet rays considerably below 2900 Angstrom units.

The reaction may be effected in a batch, intermittent or continuous manner. When effected by a batch method, the reactants may be conveyed into a suitable container, these reactants being maintained in the container either in a liquid or vapor state, or in a mixed liquid-vapor state. The container may then be illuminated with ultra-violet light for a period of time sufficient to effect the desired addition reaction. Since ordinary glass or Pyrex glass will not permit the substantial transmission of the effective light waves, namely those in the neighborhood of 2900 to 3000 A. U., and below, it is preferable to construct the container of quartz or other suitable light-transmitting materials, such as calcium fluoride, or at least to provide these containers with one or more openings or windows of quartz, calcium fluoride, or the like, through which the reactants in the interior of the container may be illuminated with ultra-violet rays. In case of a continuous process, the reactants, such as the mercaptan and the unsaturated hydrocarbon, may be conveyed, in a liquid, vapor or mixed state, through the interior of a reaction chamber which may be of a sufficient length to permit an adequate residence time for the reactants. These reactants may be subjected to ultra-violet radiations emanating from a source or sources disposed within or without the reaction chamber. In the former case, the reactor may be constructed of any material which is impervious to light, such as steel or the like, the source of the ultra-violet radiations being disposed within the chamber and in the path of the reactants passing therethrough. The discharged reaction products may then be treated by any known or suitable means or methods for the separation of the desired thio-ethers from the unreacted materials.

The invention is illustrated by the following specific examples, it being understood that there is no intention to be limited by any details thereof, since many apparent variations may be made.

Example I

Equal parts by volume of liquid propylene and n-propyl mercaptan were introduced into an evacuated transparent quartz tube which was then sealed and maintained at a temperature of about 0° C. The reactants in this tube were subjected for a period of about six minutes to the full radiation emanating from a 400 watt quartz mercury arc lamp disposed at a distance of about 20 cm. from the reactor. Thereafter, the tube was chilled and unsealed. After careful evaporation of the unreacted propylene, the remaining material was introduced into a Babcock bottle, and was washed therein with a 10% aqueous sodium hydroxide solution to remove the unreacted mercaptan. The undissolved material was then removed, dried and analyzed. This material had a boiling temperature of about 141.5° C. and a refractive index $n-20/d=1.4480$, thus indicating that it consisted of substantially pure-di-n-propyl thio-ether. The yield was somewhat greater than 96% as based on the n-propyl mercaptan employed.

Example II

Substantially equal parts by volume of liquid propylene and n-propyl mercaptan were introduced into an evacuated Pyrex glass bomb, which was then sealed. The reactants were then left in the bomb for a period of about 24 hours, the bomb being kept in the dark and at a temperature of between about 15° C. and 25° C. At the end of the 24-hour period, the contents of the tube were treated in the same manner as that described in the previous example. It was found that materially less than 10% of the mercaptan reacted with the propylene to yield the desired thio-ether.

A comparison of the results obtained in the two examples shows that ultra-violet radiations, and particularly those having wave-lengths of about 2900 to 3000 A. U. and below (which are not transmitted by Pyrex glass) effectively promote the "abnormal" addition of mercaptans to unsaturated organic compounds, such as olefins.

We claim as our invention:

1. A process of producing di-normal propyl thio-ether which comprises reacting propylene with n-propyl mercaptan while maintaining the reactants in a liquid state at a temperature not in excess of about 25° C., and subjecting the reactants to the deliberate influence of light, the essential portion of which consists of ultra-violet rays having wave-lengths of below 3000 Angstrom units.

2. A process of producing thio-ethers which comprises reacting an aliphatic mercaptan with an alpha-unsaturated aliphatic hydrocarbon at a temperature not in excess of about 25° C. while subjecting the reactants to the deliberate influence of light, the essential portion of which consists of ultra-violet rays having wave-lengths of below 3000 Angstrom units.

3. The process according to claim 2, wherein the reaction is effected substantially in a liquid state.

4. A process of producing thio-ethers which comprises reacting an aliphatic mercaptan with an unsaturated aliphatic hydrocarbon while maintaining the reactants at a temperature not in excess of about 25° C., and subjecting the reactants to the deliberate influence of light, the essential portion of which consists of ultra-violet rays having wave-lengths of below 3000 Angstrom units.

5. A process of producing thio-ethers which comprises reacting an unsaturated hydrocarbon having at least one unsaturated linkage between two carbon atoms of aliphatic character with an aliphatic mercaptan while maintaining the reactants at a temperature not in excess of about 25° C., and subjecting the reactants to the deliberate influence of light, the essential portion of which consists of ultra-violet rays having wave-lengths of below 3000 Angstrom units.

6. The process according to claim 5, wherein the unsaturated hydrocarbon is reacted via addition, with a saturated aliphatic mercaptan.

7. In a process of reacting unsaturated organic compounds with mercaptans to produce addition products, the steps of contacting an organic compound containing at least one unsaturated linkage between two carbon atoms of aliphatic character with an aliphatic mercaptan, maintaining the reactants at a temperature not in excess of about 25° C., and subjecting the reactants to the deliberate influence of light, the essential portion of which consists of ultra-violet rays having wave-lengths of below 3000 Angstrom units.

8. A process of effecting an addition reaction between mercaptans and unsaturated organic compounds which comprises contacting an aliphatic mercaptan with an organic compound containing an unsaturated linkage between two carbon atoms of aliphatic character at approximately atmospheric temperature while subjecting the reactants to the deliberate influence of light, the essential portion of which consists of ultra-violet rays having wave-lengths of below 3000 Angstrom units.

FREDERICK F. RUST.
WILLIAM E. VAUGHAN.